R. LEUMANN.
DEVICE FOR CONTROLLING THE DRIVE OF MACHINES.
APPLICATION FILED JULY 11, 1919.
1,332,443.
Patented Mar. 2, 1920.
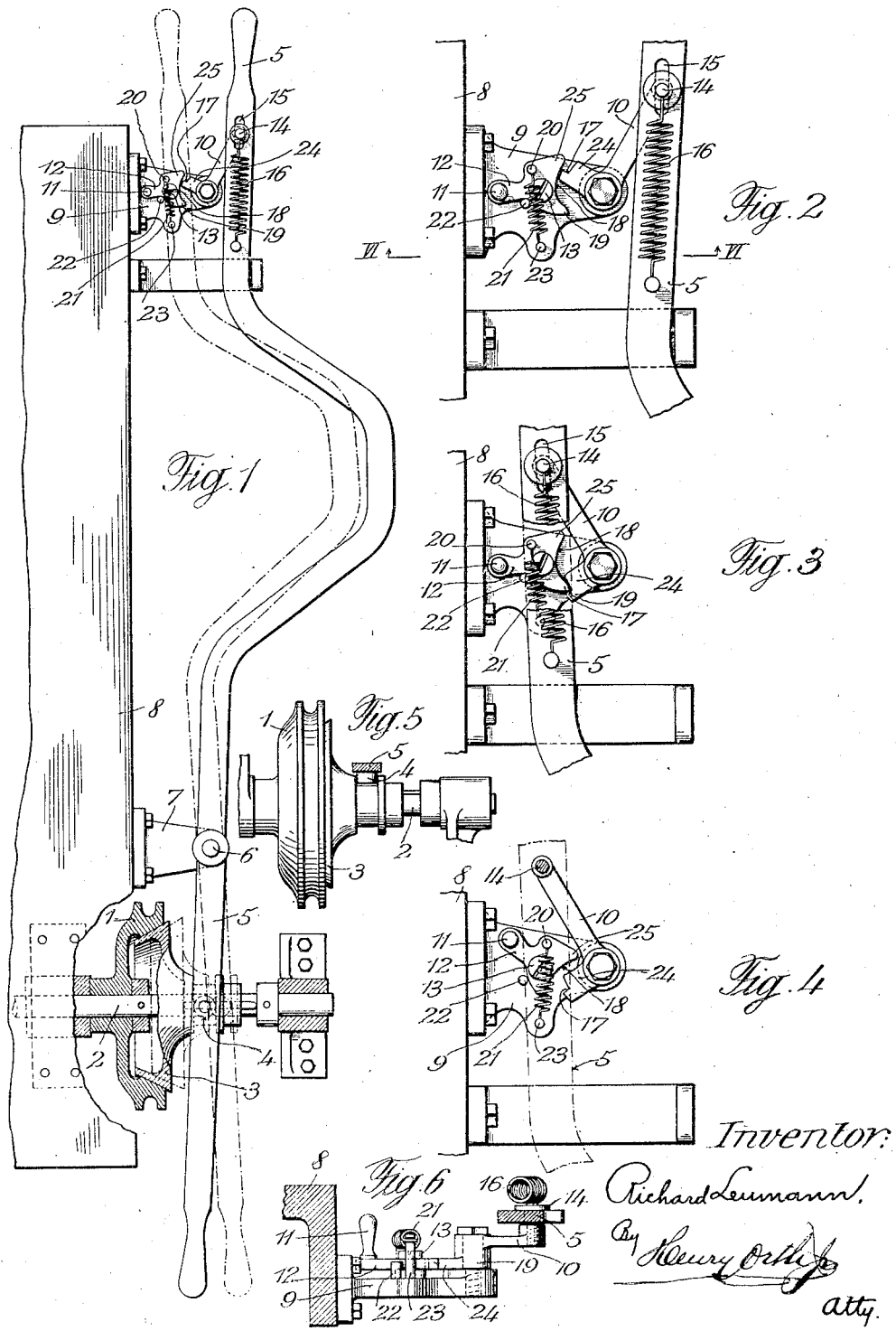

UNITED STATES PATENT OFFICE.

RICHARD LEUMANN, OF CHAILLY SUR LAUSANNE, SWITZERLAND.

DEVICE FOR CONTROLLING THE DRIVE OF MACHINES.

1,332,443.  Specification of Letters Patent.  Patented Mar. 2, 1920.

Application filed July 11, 1919. Serial No. 310,206.

*To all whom it may concern:*

Be it known that I, RICHARD LEUMANN, a citizen of the Republic of Switzerland, residing at villa "La Loex," Chailly sur Lausanne, Switzerland, have invented certain new and useful Improvements in Devices for Controlling the Drive of Machines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a device for controlling the drive of a machine of the kind in which an adjustable engaging and disengaging lever is automatically locked by a locking mechanism upon the throwing out the gear of a member adapted to transmit the drive.

In a device according to this invention the locked engaging and disengaging lever can be released in a lasting manner by means of a member adapted to be moved by hand, the arrangement being such that upon the releasing of the engaging and disengaging lever the member adapted to transmit the drive may be thrown into gear at any time and from any suitable point by means of said lever.

Advantageously, the locking mechanism may comprise an angle lever acted upon by a spring. One arm of this lever acts so in the position which it assumes when the member adapted to transmit the drive is thrown into gear upon the engaging and disengaging lever as to cause the latter to keep the member adapted to transmit the drive in its thrown in position, while the second arm of this angle lever is so moved relatively to the member adapted to be adjusted by hand upon the throwing out of gear of the member adapted to transmit the drive as to cause said angle lever to effect together with said member adapted to be moved by hand the locking of the engaging and disengaging lever.

The invention consists also in the particular construction, arrangements and combination of parts of the mechanism for controlling the drive of a machine, as will be hereinafter fully set forth and pointed out in the claims, reference being had to the accompanying drawing showing by way of example one embodiment of the invention. In this drawing:

Figure 1 is partly a front view of and partly a vertical section through the mechanism, the full lines showing the different members in the position which they assume in the position in which the member adapted to transmit the drive is thrown into gear, while the point and dash lines illustrate the members in the position which they assume when the member adapted to transmit the drive is thrown out of gear.

Fig. 2 shows a detail of Fig. 1 on an enlarged scale,

Fig. 3 illustrates how the engaging and disengaging lever is locked upon the throwing out of gear of the member adapted to transmit the drive;

Fig. 4 shows further positions which some of the members illustrated in Figs. 2 and 3 are adapted to asume;

Fig. 5 is a front view of the driving mechanism proper and

Fig. 6 is a section on the line VI—VI of Fig. 2.

Referring to the drawing, 1 designates a rope pulley loose on a shaft 2 constituting the driving shaft of a machine not shown in the drawing. The rope pulley 1 forms one half of a friction clutch, the other half of which is formed by a conical disk 3 keyed to the shaft 2 and adapted to be moved in the longitudinal direction of the latter. The disk 3 is formed integral with a sleeve 4. 5 denotes an engaging and disengaging lever coöperating with the sleeve 4 and pivotally mounted on a pin 6. The latter is supported by a bracket 7 fixed to the part 8 of the frame of the machine. To said part 8 is fixed a further bracket 9 acting as a support for a pivotally mounted angle lever 10 and a small lever 12 provided with a handle 11. The lever 12 is pivotally mounted on a screw bolt 13 screwed into the bracket 9. The angle lever 10 is provided with a pin 14 projecting through an elongated slot 15 of the engaging and disengaging lever 5. To the pin 14 is fixed one end of a spring 16, the other end of which is fixed to the lever 5. On the angle lever 10 is also provided a shoulder 17. To a pin 20 of the small lever 12 provided with a curved surface 18 and a nose 19 is fixed one end of a spring 21, the other end of which is fixed at 23 to the bracket 9. 22 designates a stop for the lever 12 provided on the bracket 9.

The operation of a mechanism for controlling the drive of a machine as hereinbefore described is as follows:

When the drive has to be transmitted to the machine to be operated, the different members of the mechanism are brought into the position illustrated in Figs. 1 and 2 in full lines. The levers 10 and 12 are then not engaging one another and the spring 16 has the tendency to rock the lever 10 in a clockwise direction, so that the lever 5 has the tendency to press the conical disk 3 toward the rope pulley 1. Owing to the position assumed at this time by the pin 20 relatively to the axis of the bolt 13, the spring 21 has the tendency to rock the lever 12 in a counter-clockwise direction, so that the latter is pressed by the spring 21 against the stop 22.

When it is desired to throw the conical disk 3 adapted to transmit the drive out of gear, the lever 5 is moved from the position illustrated in Fig. 1 in full lines into the position shown in point and dash lines. Thereby, the lever 10 is moved relatively to the lever 12 owing to the coöperation of the pin 14 of said lever 10 with the slot 15 of the lever 5. When the disk 3 has been thrown out of gear, the levers 10 and 12 assume relatively to one another the position shown in Fig. 3. In this position of said members 10, 12, the nose 19 abuts against the shoulder 17 and the spring 21 has the tendency to rock the lever 12 in a counter-clockwise direction, i. e. to press the nose 19 against the shoulder 17. In the position of the members 10, 12 shown in Fig. 3, the lever 10 is prevented from rocking in a clockwise direction and the lever 5 is consequently locked, any throwing into gear of the disk 3 with the pulley 1 being then rendered impossible. The latter can only be effected upon the releasing of the lever 5. To this end it is necessary to move the lever 12 by means of the handle 11 into the position illustrated in Fig. 4. In this position of the levers 10 and 12, the shoulder 17 and the nose 19 are again wholly out of engagement, and as the spring 21 has now the tendency to move the lever 12 in a clockwise direction, the releasing of the lever 5 is a lasting one, so that the latter can be returned either at once or also after a certain interval of time into the position shown in Fig. 1 in full lines. For the purpose of returning the lever 5 into the position shown in Fig. 1, it can be acted upon at any suitable point as the locking mechanism has no longer to be influenced in any way after the lever 12 has been moved by hand into the position shown in Fig. 4. This is not the case in the devices of this kind hitherto proposed, where upon the throwing into gear of the members adapted to transmit the drive also the locking mechanism has to be acted upon; in consequence of this the engaging and disengaging lever has always to be seized at a determinate point. In the position of the members shown in Fig. 4, the conical disk 3 is not yet in engagement with the pulley 1. Upon the throwing into engagement of the disk 3 with the pulley 1 by means of the released lever 5, the arm 24 of the lever 10 strikes then against the nose 25 of the lever 12 moving thereby the latter in a counter-clockwise direction, so that it is moved back into the position shown in Figs. 1 and 2. As long as the line connecting the attaching points 20, 23 of the spring 21 is on the right hand side of the axis of the bolt 13, the spring 21 has the tendency to prevent said movement of the lever 12, while it tries to move the latter in said direction as soon as the line connecting the attaching points 20, 23 lies on the left hand side of the axis of the bolt 13.

What I claim now as my invention is:—

1. A device for controlling the drive of a machine, comprising a member for transmitting the drive, a movable engaging and disengaging member coöperating with said first mentioned member for the purpose of throwing it into and out of gear, and two elements for automatically locking said engaging and disengaging member upon moving the drive transmitting member out of driving position, one of said elements arranged to be manually moved so that a part thereof projects into the path of the second element when said second element is unlocked, whereby said second element strikes said part when the engaging and disengaging member is moved in one direction and returns said first element into initial position preparatory to locking said second element upon a reverse movement of said engaging and disengaging member.

2. A device for controlling the drive of a machine, comprising a member adapted to transmit the drive, a movable engaging and disengaging lever adapted to coöperate with said member for the purpose of throwing it in and out of gear, an angle lever operatively connected to said engaging and disengaging lever, means adapted to so act upon said angle lever as to cause it to keep the member adapted to transmit the drive in its thrown-in position, and a member adapted to be so moved by said angle lever when the member adapted to transmit the drive is thrown out of gear as to cause it to effect together with said angle lever a locking of the engaging and disengaging lever, said last mentioned member being also adapted to be moved by hand in order to release in a lasting manner the engaging and disengaging lever and to permit a throwing into gear of said member adapted to transmit the drive at any time and from any point by means of the engaging and disengaging lever.

3. A device for controlling the drive of a machine, comprising a member adapted to transmit the drive, a movable engaging and disengaging lever adapted to coöperate with said member for the purpose of throwing it in and out of gear, an angle lever operatively connected to said engaging and disengaging lever, means adapted to so act upon said angle lever as to cause it to keep the member adapted to transmit the drive in its thrown-in position, a pivotally mounted lever adapted to be so moved by said angle lever when the member adapted to transmit the drive is thrown out of gear as to cause it to effect together with said angle lever a locking of the engaging and disengaging lever, said pivotally mounted lever being also adapted to be moved by hand in order to release in a lasting manner the engaging and disengaging lever, and a spring connected at one end to said pivotally mounted lever, the point of attack of said spring on the pivotally mounted lever being moved onto the opposite side of the pivot axis of said lever when the latter is moved by hand.

4. A device for controlling the drive of a machine, comprising a member adapted to transmit the drive, a movable engaging and disengaging lever adapted to coöperate with said member for the purpose of throwing it in and out of gear, an angle lever, one arm of the latter being operatively connected to said engaging and disengaging lever and the other arm being provided with a recess, and a pivotally mounted lever adapted to be moved by hand and having a curved surface limited by two noses, one of said noses being caused to engage the shoulder of the angle lever when the member adapted to transmit the drive is thrown out of gear so that the engaging and disengaging lever is locked until the pivotally mounted lever is moved by hand, and the latter being returned into its original position by the angle lever upon the throwing into gear of the member adapted to transmit the drive.

5. In a clutch shifting mechanism, a pivoted shifting lever, a pivoted latch, a spring therefor and means operated by and connected to said lever to be moved into position to be engaged by said latch for one position of the clutch, said spring arranged to retain the latch in either latching or unlatching position and said latch having a part lying in the path of said means when in unlatched position, whereby movement of said means in one direction causes the return of said latch to initial latching position preparatory to latching said means upon reverse throw of said shifting lever.

In testimony that I claim the foregoing as my invention, I have signed my name.

RICHARD LEUMANN.

Witnesses:
 Eugène Laure,
 Emile Giddey.